UNITED STATES PATENT OFFICE.

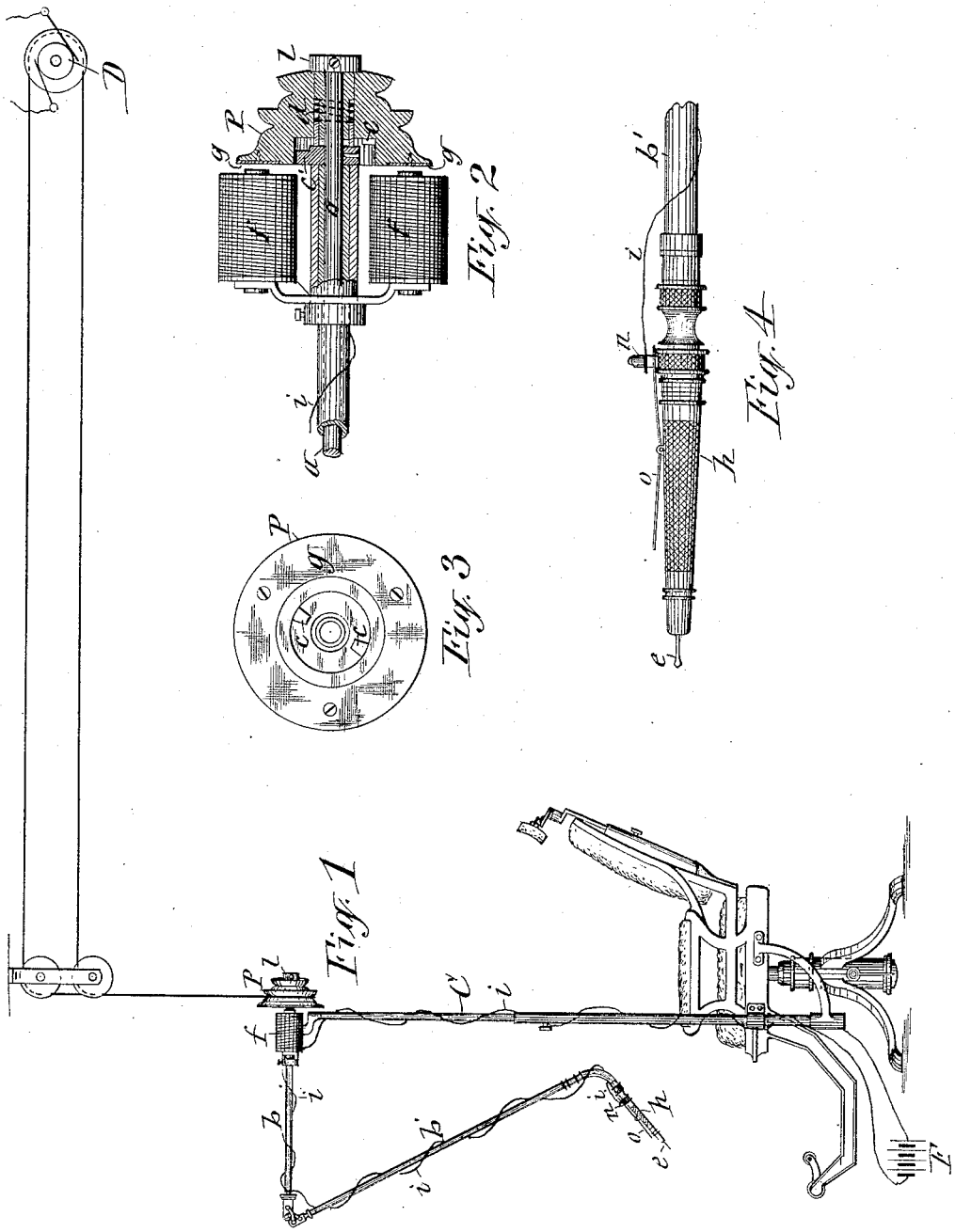

AUGUSTUS R. COOKE, OF SYRACUSE, NEW YORK.

STOP-MOTION FOR DENTAL ENGINES.

SPECIFICATION forming part of Letters Patent No. 407,950, dated July 30, 1889.

Application filed April 8, 1889. Serial No. 306,331. (No model.)

*To all whom it may concern:*

Be it known that I, AUGUSTUS R. COOKE, of Syracuse, in the county of Onondaga, in the State of New York, have invented new and useful Improvements in Stop-Motions for Dental Engines, &c., of which the following, taken in connection with the accompanying drawings, is a full, clear and exact description.

The object of this invention is to provide ready means for connecting and disconnecting the dental engine with a continuously-revolving driving-pulley and to enable the dentist to start and stop the motion of the dental instrument without interfering with the operation of other instruments or machines driven by the same motor, as in large dental offices or clinique-rooms of dental colleges, and wherever it may be desirable to use more than one instrument simultaneously, in which case my invention permits all the instruments to be operated independently of each other by one and the same motor; and the object of the invention is, furthermore, to adapt the instrument to be laid aside in a dormant condition as soon as the operator is through with the use of it; and to that end the invention consists in the combination, with the shaft of the dental engine, motor, and driving-belt, of a clutch member fixed to said shaft, a sliding pulley on the same shaft, a clutch member fixed to the side of the pulley, a spring forcing the two clutch members apart, an armature on the same side of the pulley, to which the clutch member is affixed, electro-magnets facing said armature, an electric circuit, including said magnets, and a circuit maker and breaker connected to the handle of the dental instrument and normally in its open position to allow the two clutch members to be held separated by the action of the spring, all as hereinafter more fully described, and set forth in the claims.

In the annexed drawings, Figure 1 is an elevation of a dental engine equipped with my improved stopping and starting device. Fig. 2 is an enlarged longitudinal section of said device. Fig. 3 is a detached face view of the driving-pulley; and Fig. 4 is an enlarged detached perspective view of a dental instrument or tool, showing the circuit maker and breaker connected thereto.

$a$ represents the engine-shaft, which is usually composed of flexibly-connected sections inclosed in sleeves $b$ $b'$, one of which is supported horizontally and adjustably on the upper end of a standard C, which latter is in some cases secured to the dentist's chair and in other cases provided with a separate support. To the free end of the sleeve $b'$ is connected the handle $h$ of the dental instrument $e$, and the latter is suitably connected with the shaft inclosed in the handle to partake motion from said shaft.

P denotes the driving-pulley, which I mount loosely on the shaft at the usual position. To one side of said pulley I firmly attach a dog or clutch member $c$, and adjacent to and facing said clutch member I place a co-operating clutch member $c'$, which I rigidly attach to the shaft $a$, as shown in Fig. 2 of the drawings. A spring $d$, interposed between the two clutch members, holds the same normally apart, and thus the shaft $a$ is normally at rest or left dormant while the pulley continues in motion, this being the salient feature of my improvement. A collar $l$, secured to the shaft at the opposite side of the pulley, limits the sliding movement of said pulley in that direction. The pulley may derive its rotary motion either from an electromotor D, located at a safe distance from the dentist's chair, or from any other suitable motor.

It will be observed that my improved stop-motion does not interfere with the operation of the motor nor with the operation of other engines or machines that may be driven by the same motor, but merely stops and starts the motion of the shaft $a$ of the dental engine. The pulley P being loose on the shaft, as aforesaid, and the clutch members normally out of engagement prevent transmission of motion to said shaft, and the same is normally at rest while the motor may be maintained in operation.

For throwing the clutch members into engagement, I employ electro-magnets $ff$ in a local circuit, the battery of which is represented at F. These magnets are mounted on the upper end of the standard C, and face the side of the pulley P, to which is firmly attached an annular armature $g$.

The standard C, sleeves $b$ $b'$, and tool-handle $h$ constitute one of the conductors of the aforesaid local circuit, and wires $i\,i$ serve as the other conductor.

The handle $h$, I provide with a hard-rubber binding-post $n$, to which I attach the end of the wire $i$, and thus establish thereon one of the terminals of the local circuit. The other terminal I form of a lever or suitable key $o$, pivoted to the handle $h$, so as to be conveniently manipulated by the dentist using the tool or instrument carried in said handle. Said key is normally out of contact with the terminal on the binding-post $n$, and thus the circuit is normally open and the shaft $a$ at rest.

In operating with the dental tool the dentist presses either with the thumb or with one of the fingers of the hand holding the handle $h$, and thereby brings the key in contact with the terminal on the binding-post $n$, which contact closes the circuit. This causes the magnets $f\,f$ to be energized, and the attraction of the armature $g$ draws the pulley P toward the clutch member $c'$ and causes the same to engage the clutch member $c$ on the pulley, which then transmits rotary motion to the shaft $a$.

When the operator desires to stop the motion of the dental engine, he merely releases the key $o$, and no attention need to be paid to the motion of the motor or driving-pulley, which may continue in motion and allow other engines or machines to be driven thereby.

As already hereinbefore stated, my improved stop-motion may be applied to various engines or machines, and the operator is enabled to stop and start the engine by simply releasing the key $o$ from pressure, and consequently the operation of the tool or instrument is under perfect control of the operator.

I do not limit myself specifically to the construction of the clutch and its connection with the shaft herein shown, as it is obvious that other well-known forms of clutches are adapted for the same purpose. Neither do I limit myself to the particular form of the key $o$, as the same is susceptible of various modifications.

What I claim as new is—

The combination, with the engine-shaft $a$, motor, and driving-belt, of a clutch member fixed to said shaft, a sliding pulley on the same shaft, a clutch member fixed to the side of the pulley, a spring forcing the two clutch members apart, an armature on the same side of the pulley to which the clutch member is affixed, electro-magnets facing said armature, an electric circuit, including said magnets, and a circuit maker and breaker connected to the handle of the dental instrument and normally in its open position, allowing the two clutch members to be held separated by the action of the spring, substantially as set forth.

In testimony whereof I have hereunto signed my name this 6th day of April, 1889.

AUGUSTUS R. COOKE. [L. S.]

Witnesses:
C. H. DUELL,
MARK W. DEWEY.